United States Patent

Trump

[15] 3,695,698
[45] Oct. 3, 1972

[54] RESTRAINT DEVICE FOR VEHICLE CAB SLEEPER BUNK

[72] Inventor: Norman M. Trump, Emmaus, Pa.

[73] Assignee: Mark Trucks, Inc., Allentown, Pa.

[22] Filed: June 1, 1971

[21] Appl. No.: 148,384

[52] U.S. Cl. .................................. 297/390, 297/385
[51] Int. Cl. ............................................. A62b 35/60
[58] Field of Search ........ 297/390, 384, 385; 296/24, 296/28 C, 28.21, 66; 5/9, 118

[56] References Cited

UNITED STATES PATENTS

| | | | |
|---|---|---|---|
| 2,316,710 | 4/1945 | Parke | 5/9 R |
| 2,531,687 | 11/1950 | Jones | 5/9 R |
| 2,532,007 | 11/1950 | Biasell | 297/390 X |
| 3,494,633 | 2/1970 | Malloy | 297/390 X |

Primary Examiner—James T. McCall
Attorney—Brumbaugh, Graves, Donohue & Raymond

[57] ABSTRACT

A restraint device for protecting the occupant of the sleeper bunk of a vehicle cab includes a web-like harness, constructed of flexible straps, that is supported within and attached to the cab structure so as to provide a vertical leg extending across the open front side of the bunk and a horizontal leg extending over the bunk to the rear cab structure. This harness arrangement transmits a portion of any forwardly directed forces received by the harness to the rear cab structure, thus reducing the horizontal load imposed on the supports for the vertical leg. Quick release buckles are provided in the harness to allow the occupant ready egress from the bunk. The harness also converts into a hammock-type storage area when the bunk is not in use.

8 Claims, 2 Drawing Figures

PATENTED OCT 3 1972      3,695,698

INVENTOR.
NORMAN M. TRUMP
BY Brumbaugh, Graves,
Donohue & Raymond
his ATTORNEYS

RESTRAINT DEVICE FOR VEHICLE CAB SLEEPER BUNK

BACKGROUND OF THE INVENTION

This invention relates to a restraint device for the sleeping compartment or bunk of a vehicle cab, and is intended primarily to prevent an occupant of the bunk from being thrown therefrom as a result of sudden stops, swerves, or the like of the vehicle.

Vehicles currently used for transporting commodities over long distances often include a sleeping compartment or bunk in the operators' cab. In a typical situation, the vehicle is driven on an essentially non-stop schedule, so that the bunk will normally be occupied by an alternate operator while the vehicle is in route. The compartment might also be used by a driver when other sleeping accommodations are not available.

In either instance, it is important from the standpoint of driver safety that provision be made to protect an occupant of the bunk against accidental dislodgment from the bunk, whether caused by rolling of the occupant when asleep or by sudden stops, swerves, or other movement when the vehicle is on the road. Indeed, the installation of a restraint device for this purpose is required by regulations promulgated by The Bureau of Motor Carrier Safety Regulations. In part, those regulations specify that such a bunk restraint system shall be capable of withstanding a force of 6,000 pounds applied toward the front of the vehicle and parallel to the longitudinal axis of the vehicle.

The present invention fully meets the above and all other requirements of the regulations, and additionally affords advantages in respect of load distribution and cab structure design, ease of egress from the bunk in emergency situations, and the provision of storage space when the bunk is not in use.

SUMMARY OF THE INVENTION

In accordance with the invention, a restraint device for the sleeping compartment of a vehicle cab is provided which employs a flexible, elongated harness that is secured at one free end to the cab structure adjacent the front side of the bunk and at the other end to the cab structure at the rear of the bunk. The harness is also supported by the cab structure at a point intermediate its ends in a manner to form a generally vertical harness leg lying across the open front side of the bunk and a generally horizontal leg extending from the vertical leg to the rear of the cab. By virtue of this harness configuration and anchoring arrangement, not only is the bunk occupant fully protected against being thrown out of or falling from the bunk but any forwardly directed forces applied to the harness are transmitted in part, i.e., the horizontal component, to the rear cab structure. Consequently, the supporting structures for the vertical leg may safely be reduced in size, particularly in horizontal section, with attendant savings in space, weight and cost of manufacture.

A provision for quick release of the restraining harness is included, so that the occupant may escape from the bunk with ease in the event of an emergency. As another feature of the invention, the lower end of the vertical leg may be readily disconnected from the cab structure and engaged with cooperating members at the rear of the cab to form a convenient storage area when the bunk is not in use.

BRIEF DESCRIPTION OF THE DRAWING

For a better understanding of the invention, reference may be made to the following description of an exemplary embodiment taken in connection with the figures of the accompanying drawing in which.

DESCRIPTION OF AN EXEMPLARY EMBODIMENT

Figure 1:
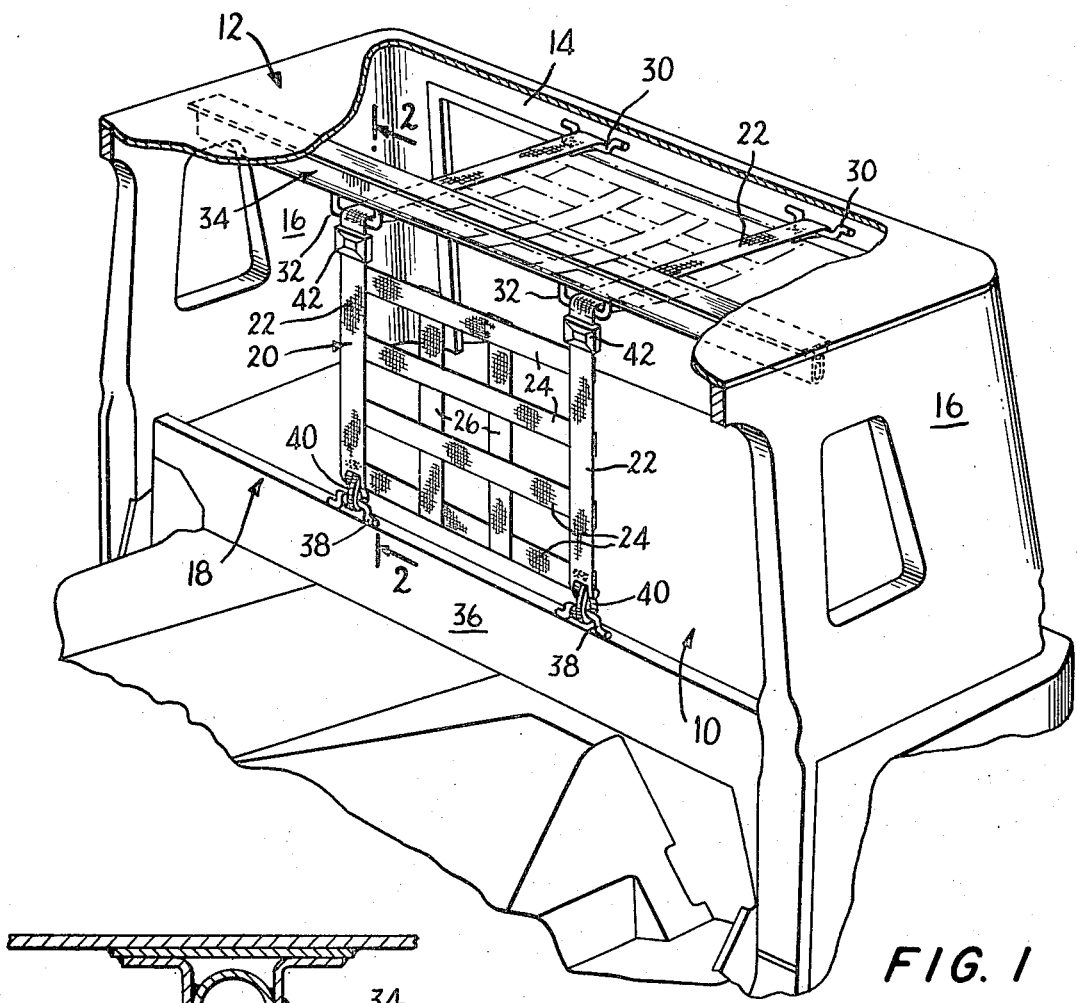
FIG. 1 illustrates, in perspective, the sleeper bunk restraint device of the present invention as installed in a vehicle cab, with the restraining position of the harness being indicated in full lines and the storage position in phantom lines.

FIG. 1 depicts a typical arrangement of a sleeper bunk 10 within a vehicle cab 12, i.e., so that the bunk lies transverse to the longitudinal axis of the vehicle and is enclosed on the back side by the rear cab structure 14 and at either end by the side walls 16 of the cab. The front side 18 of the bunk 10 normally is open over the full length of the bunk, and it is in this area that a restraining device is required for the safety of a person using the bunk.

A representative embodiment of the restraining device of the invention is shown installed in FIG. 1. It includes a harness 20 that, according to a preferred construction, is built up of two elongated side straps 22 which are connected together, beginning at one end and extending along a portion of their lengths, by a number of cross straps 24. Still other straps 26 may be used to tie the cross straps 24 together, thus forming with the side straps and cross straps a web assembly of sufficient strength to meet or exceed the load restraining requirements established by Federal regulations. Preferably, the straps are composed of woven material, such as, for example, that used for vehicle seat belts and shoulder belts.

It is a feature of the invention that the harness 20 is secured to the cab 12 in a way to transmit the horizontal component of any forwardly directed forces applied to it to the rear cab structure 14. For that purpose, the ends of the side straps 22 spaced from the cross straps 24 are connected to U-shaped footman loops 30, or equivalent devices, anchored to the rear cab structure 14. For there, the straps 22 are extended toward the front of the cab and are passed through similar loops 32 attached to the rear side of a cross bow 34 in the roof of the cab (see FIG. 2). The straps 22 are then directed downward, to be secured at the web end of the harness to the bunk rail 36 or some other suitable rigid part of the cab.

Figure 2:
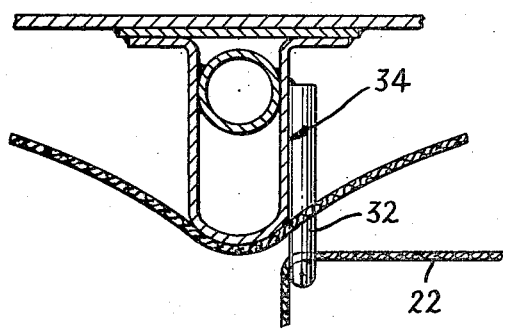
FIG. 2 is an enlarged detail view taken along the line 2—2 of FIG. 1 and looking in the direction of the arrows.
Figure 2:
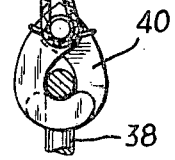

Attachment of the lower end of the harness 20 to the bunk rail 36 is effected through footman loops 38 or the like mounted on the rail and releasable anchors 40 carried by the straps 22 (see FIG. 2). Although any suitable devices of a releasable nature may be utilized for the anchors 40, they preferably are of the one-way type commonly used to fasten vehicle seat belts to floor supports. Such devices may, for example, be spring biased to the closed or locked position to prevent inadvertent disconnection of the harness 20 from the loops 38.

When assembled in the restraint position, i.e., the position shown in full in FIG. 1, the harness 20 thus has two legs, a generally horizontal leg leading from the rear loops 30 to the bow loops 32 and a generally vertical leg extending from the bow loops 32 to the loops 38 on the bunk rail 36. It will be apparent, therefore, that if a force is delivered to the vertical harness leg, as by the bunk occupant being thrown forward as a result of a hard stop of the vehicle, for example, the horizontal component of such force will be transmitted by the horizontal harness leg and loops 30 to the rear cab structure 14. Hence, the roof bow 34 bears only the vertical component of the force. Because of this diversion of a portion of the load imposed on the harness 20 to the rear structure 14, the size of the roof bow 34 may be significantly reduced, particularly in horizontal section, from that which would be required if no such division of the load were effected. This permits a bow of feasible size to be incorporated in the cab roof without sacrificing structural rigidity, since essentially only vertically directed loads are borne by the bow and the vertical section of the bow remains adequate to absorb all such loads. Savings in weight, space and costs of manufacture are of course realized as a result of the bow size reduction made possible by the invention.

Should an emergency arise which necessitates rapid escape by the bunk occupant, a quick-release buckle 42, again conveniently of the type used with vehicle seat belts, is included in each side strap 22 near its upper end. For added accessibility, the buckles 42 desirably are arranged to be operated from the bunk side, that is to say, the release mechanism of each buckle faces the occupant. Upon release of the buckles, the harness 20 immediately drops out of the way, affording a clear exit from the bunk.

As another feature of the invention, the harness 20 may be converted into a hammock-type sling for service as a storage area when the bunk is not in use. To this end, the buckles 42 are engaged in the normal way to join the vertical and horizontal legs of the harness together. The anchors 40 are then released from the loops 38 on the bunk rail 36 and the vertical harness leg swung back beneath the horizontal leg to the position indicated in phantom in FIG. 1. The vertical leg is retained in this position by engaging a metal ring 44 (see FIG. 2) stitched or otherwise fastened to the lower end of each side strap 22 over an upwardly opening hook (not shown) formed on the associated footman loop 30 on the rear cab structure 14. A convenient, readily usable, hammock-type area is thus provided which is particularly suited for storing blankets and other personal gear.

It will be understood by those skilled in the art that the above-described embodiment is intended to be merely exemplary, in that it is susceptible of modification and variation without departing from the spirit and scope of the invention, as set forth in the appended claims.

I claim:

1. An occupant restraint device adapted to be positioned across the open front side of a sleeper bunk in a vehicle cab comprising:
    an elongated flexible harness,
    means securing one free end of the harness to the cab structure adjacent the front side of the bunk,
    means securing the other free end of the harness to the cab structure at the rear side of the bunk and
    means attached to the cabin structure for supporting the harness at a point intermediate its free ends so as to form a generally vertical harness leg extending across the open front side of the bunk and a generally horizontal harness leg extending from the vertical leg to the rear cabin structure, whereby forces received by the vertical leg in preventing the occupant from being dislodged from the bunk are transmitted in part to the rear cabin structure.

2. An occupant restraint device according to claim 1 further comprising quick-release means associated with the harness for allowing rapid disassembly thereof by the bunk occupant, thereby permitting ready escape from the bunk in the event of an emergency.

3. An occupant restraint device according to claim 2 wherein the quick-release means comprises one or more quick-release buckles included in the vertical leg of the harness for releasably connecting together two segments thereof.

4. An occupant restraint device according to claim 1 wherein the vertical leg of the harness includes a plurality of straps interconnected to form a web assembly, and wherein the horizontal leg includes at least one strap that extends through the intermediate harness supporting means and is connected to the vertical web assembly.

5. An occupant restraint device according to claim 4 further comprising quick-release means interposed in the vertical leg for releasably connecting at least the one strap included in the horizontal leg to the vertical web assembly.

6. An occupant restraint device according to claim 1 wherein the free end of the vertical harness leg secured to the cab structure is the lower end, the free end of the horizontal harness leg is secured to the rear cabin structure at a point above the bunk, and the intermediate harness supporting means is attached to the cab roof structure at a point spaced forwardly of the rear cab structure.

7. An occupant restraint device according to claim 6 further comprising means, carried by the vertical harness leg adjacent the lower end thereof, adapted for engagement with cooperating means associated with the means for securing the horizontal harness leg to the rear cab structure, and wherein the means for securing the lower end of the harness vertical leg to the cab structure is releasable, whereby the harness vertical leg may be extended rearwardly beneath the harness horizontal leg and secured to the cooperating means on the rear cab structure so as to provide a hammock-type area.

8. An occupant restraint device according to claim 6 further comprising quick-release means included in the harness vertical leg adjacent the upper end thereof for allowing rapid disassembly of the harness by an occupant of the bunk, thereby permitting ready escape by the occupant in the event of an emergency.

* * * * *

PO-1050
(5/69)

UNITED STATES PATENT OFFICE
CERTIFICATE OF CORRECTION

Patent No. 3,695,698      Dated October 3, 1972

Inventor(s) Norman M. Trump

It is certified that error appears in the above-identified patent and that said Letters Patent are hereby corrected as shown below:

Page 1, Assignee: "Mark Trucks, Inc." See recorded Assignment should be --Mack Trucks, Inc.--
Column 1, line 12, "operators' " should be --operator's--
Column 2, line 50, "for" should be --from--
Column 4, line 4, "bunk and" should be --bunk, and--
Column 4, lines 55, 56, "hammock-type area." should be --hammock-type storage area.--

Signed and sealed this 13th day of February 1973.

(SEAL)
Attest:

EDWARD M. FLETCHER, JR.
Attesting Officer

ROBERT GOTTSCHALK
Commissioner of Patents